US010122875B2

(12) United States Patent
Miyamoto et al.

(10) Patent No.: US 10,122,875 B2
(45) Date of Patent: Nov. 6, 2018

(54) IMAGE READING APPARATUS WITH MOVABLE READING UNIT

(71) Applicant: SEIKO EPSON CORPORATION, Tokyo (JP)

(72) Inventors: Shintaro Miyamoto, Shiojiri (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/435,521

(22) Filed: Feb. 17, 2017

(65) Prior Publication Data
US 2017/0251115 A1 Aug. 31, 2017

(30) Foreign Application Priority Data

Feb. 26, 2016 (JP) .................. 2016-035195

(51) Int. Cl.
G03G 15/04 (2006.01)
H04N 1/00 (2006.01)
H04N 1/10 (2006.01)

(52) U.S. Cl.
CPC ....... *H04N 1/00525* (2013.01); *H04N 1/0057* (2013.01); *H04N 1/1026* (2013.01); *H04N 2201/0081* (2013.01); *H04N 2201/0446* (2013.01)

(58) Field of Classification Search
CPC .............................. H04N 1/00525
USPC ........................................ 399/211
See application file for complete search history.

(56) References Cited

U.S. PATENT DOCUMENTS

| 5,964,542 A * | 10/1999 | Ruhe | B41J 19/005 400/162.1 |
| 2013/0194347 A1* | 8/2013 | Terada | B41J 19/202 347/37 |
| 2017/0251116 A1 | 8/2017 | Miyamoto et al. | |

FOREIGN PATENT DOCUMENTS

| JP | 11-215320 A | 8/1999 |
| JP | 2003078682 | 3/2003 |
| JP | 2017153002 A | 8/2017 |
| JP | 2017153003 | 8/2017 |

OTHER PUBLICATIONS

Office Action issued in U.S. Appl. No. 15/433,577 dated Jan. 11, 2018.
Notice of Allowanec issued in U.S. Appl. No. 15/433,577 dated Apr. 25, 2018.

* cited by examiner

*Primary Examiner* — Quana M Grainger
(74) *Attorney, Agent, or Firm* — Workman Nydegger

(57) ABSTRACT

A moving mechanism of a reading unit includes a driving pulley, a plurality of driven pulleys which are rotatably driven, an endless belt which is engaged and rotates between the driving pulley and the plurality of driven pulleys, and attracts the reading unit, and a biasing unit which applies tension to the endless belt, in the endless belt, an attraction section which is a belt section that extends along the auxiliary scanning direction, and which attracts the reading unit, is formed between a first driven pulley and a second driven pulley, the driving pulley is provided at a position separated from the attraction section in the main scanning direction, and a biasing force of the biasing unit is applied to the belt section excluding the attraction section in the endless belt.

9 Claims, 14 Drawing Sheets

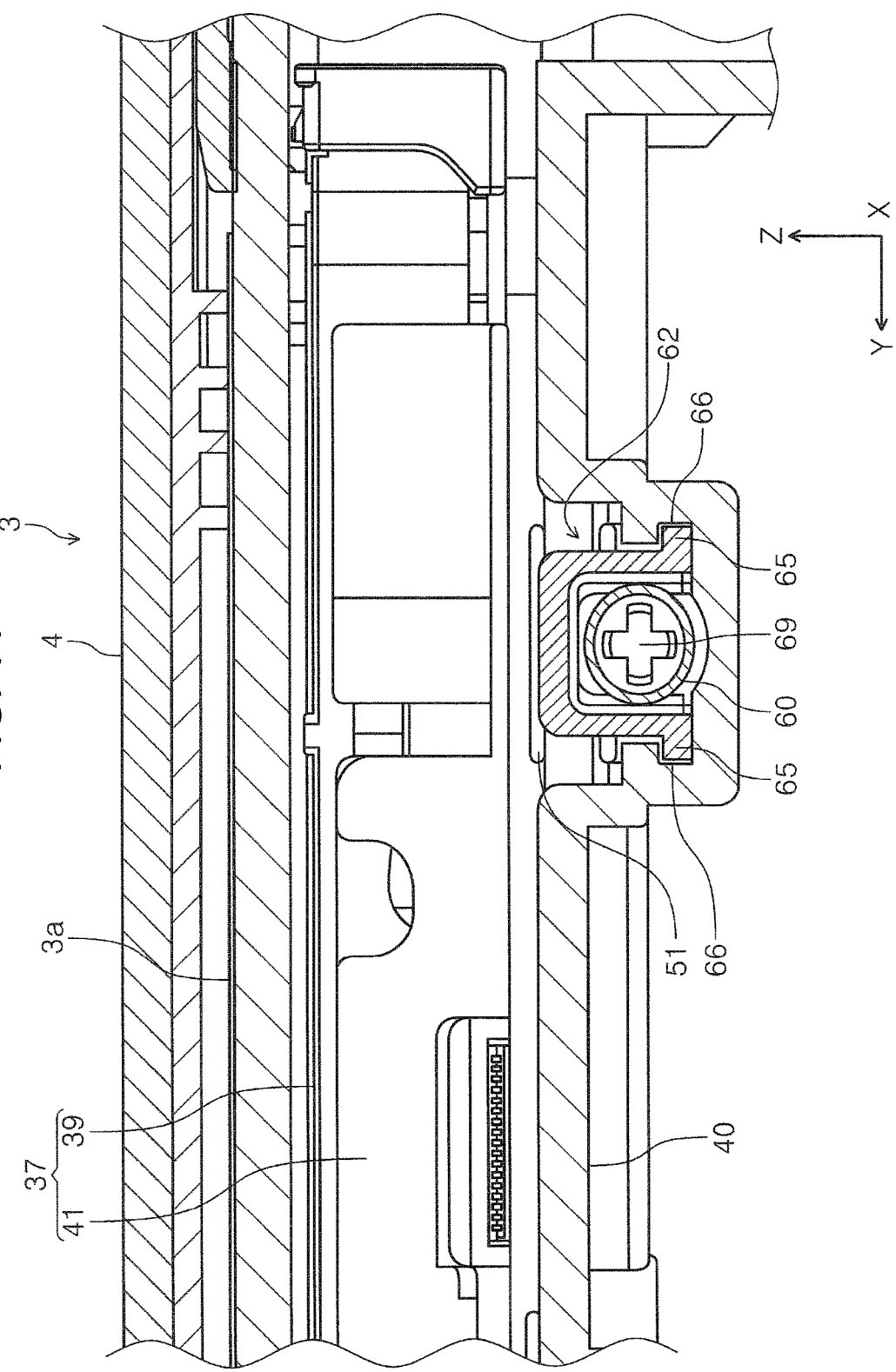

IMAGE READING APPARATUS WITH MOVABLE READING UNIT

BACKGROUND

1. Technical Field

The present invention relates to an image reading apparatus which reads an image of a document and a recording apparatus including the image reading apparatus.

2. Related Art

In a recording apparatus which performs recording on a recording medium, there is an apparatus which is integrally configured of a recording mechanism portion which performs the recording on the recording medium, and a reading mechanism portion (also referred to as an image reading apparatus and a scanner) which reads a document.

However, in a moving mechanism of a reading unit in a flat-bed type image reading apparatus, there is a method of fixing the reading unit to a timing belt hooked to a driving pulley which rotates by a driving source and a driven pulley which is rotated to be driven by the driving pulley, and of attracting the reading unit by rotating the driving pulley and by moving the timing belt.

For example, in JP-A-11-215320, the timing belt stretches to the driving pulley and the driven pulley which are provided at both ends in the moving direction of the reading unit.

Here, the timing belt is configured so that a predetermined tensile force (tension) is applied by a belt tension mechanism.

In JP-A-11-215320, the driven pulley is pivotally supported to be rotatable around a holder that is movable in the winding direction of an endless belt, the holder is biased in the direction of being separated from the driving pulley by a biasing unit, such as a spring, and the tension is applied to the timing belt.

In this configuration, in the moving direction of the reading unit, an operation range of the driven pulley biased by the biasing unit becomes necessary in addition to a moving region of the reading unit, and there is a limit to reduction of the size of the image reading apparatus.

SUMMARY

An advantage of some aspects of the invention is to suppress an increase in size of an apparatus in accordance with installation of a mechanism which biases an endless belt.

According to an aspect of the invention, there is provided an image reading apparatus including: a reading unit which extends in a main scanning direction, and is movable in an auxiliary scanning direction intersecting with the main scanning direction; and a moving mechanism which moves the reading unit, in which the moving mechanism includes a driving pulley which is driven by a power source, a plurality of driven pulleys which are rotatably driven, an endless belt which is engaged and rotates between the driving pulley and the plurality of driven pulleys, and attracts the reading unit, and a biasing unit which applies tension to the endless belt, in which, in the endless belt, an attraction section of a belt section that extends along the auxiliary scanning direction, and which attracts the reading unit, is formed between a first driven pulley and a second driven pulley, in which the driving pulley is provided at a position separated from the attraction section in the main scanning direction, and in which a biasing force of the biasing unit is applied to the belt section excluding the attraction section in the endless belt.

According to the aspect, it is not necessary to set the operation range in the first driven pulley or the second driven pulley for applying the tension to the endless belt, and in the auxiliary scanning direction, it is possible to provide the moving mechanism in a small space. Accordingly, it is possible to realize reduction of the size of the image reading apparatus.

In the image reading apparatus, the driving pulley may be provided at a position of not protruding to the outside from the first driven pulley and the second driven pulley in the auxiliary scanning direction.

According to the aspect, it is possible to provide the moving mechanism in a smaller space in the auxiliary scanning direction.

In the image reading apparatus, the biasing unit may be provided in the belt section of which the distance is the shortest in the endless belt.

According to the aspect, it is possible to reduce the movable region of the movable member when the tension is applied to the endless belt.

In the image reading apparatus, a plurality of the driven pulleys may be provided to be retreatable in the biasing direction by the biasing unit, and may be provided with a third driven pulley which applies tension to the endless belt by receiving the biasing force of the biasing unit.

According to the aspect, it is possible to apply the tension to the endless belt by the third driven pulley which is rotatably driven.

In the image reading apparatus, a holder which supports the third driven pulley, is biased by the biasing unit, and is displaceable in the biasing direction, may be provided, and the biasing unit may be covered with the holder.

According to the aspect, since biasing unit is covered with the holder, the biasing unit is not exposed, and it is possible to make an excellent appearance.

In the image reading apparatus, the biasing unit may be a compression spring.

According to the aspect, the biasing unit imparts the biasing force to the third driven pulley via the holder, and it is possible to easily realize a configuration in which the biasing unit is covered with the holder.

According to another aspect of the invention, there is provided a recording apparatus including: a recording mechanism portion provided with a transport unit that transports a recording medium, and a recording unit that performs recording on the transported recording medium; and the image reading apparatus according any of the first to the sixth aspects which is provided in an upper portion of the recording mechanism portion.

According to the aspect, in the recording apparatus provided with the recording mechanism portion and the image reading apparatus, it is possible to obtain an action effect similar to that of any of the first to the sixth aspects.

In the recording apparatus, a biasing mechanism including the biasing unit may be disposed to avoid a transport region of the recording medium in a medium width direction intersecting with a transport direction of the recording medium.

In the recording apparatus, in the recording mechanism portion, a configuration member, such as the transport unit or the recording unit, is provided in a transport region of the recording medium.

Meanwhile, in a case where the image reading apparatus is provided in the upper portion of the recording mechanism portion, it is necessary to provide the biasing mechanism including the biasing unit at the height which does not interfere with the configuration member which is the recording mechanism portion positioned at a lower part thereof.

According to the aspect, since the biasing mechanism including the biasing unit is disposed to avoid the transport region of the recording medium in which the configuration member, such as the transport unit and the recording unit, is disposed, in the medium width direction intersecting with the transport direction of the recording medium, a degree of freedom of layout of the biasing mechanism is improved.

In the recording apparatus, the image reading apparatus may include a first linking portion and a second linking portion which are linked to be rotatable to the recording mechanism portion in an upper portion of the recording mechanism portion, open and close the upper portion of the recording mechanism portion by rotating, and are linked to be rotatable to the recording mechanism portion which is disposed on the outside of a moving region when the moving region of the reading unit is viewed in a plan view, and a power source of the reading unit may be disposed at least in one of the first linking portion and the second linking portion.

According to the aspect, since the power source of the driving pulley is disposed in the first linking portion and the second linking portion which are disposed on the outside of the moving region when the moving region of the reading unit is viewed in a plan view, and which are linked to be rotatable to the recording mechanism portion, that is, the power source is disposed by using a configuration part for making it possible to rotate the image reading apparatus, it is possible to achieve reduction of the size of the apparatus.

Additionally, there are many cases where the power source of the reading unit in the image reading apparatus is a heavy object, such as a motor, but since the power source which is such a heavy object is not disposed in the moving region but in the vicinity of the rotation shaft, it is possible to open the image reading apparatus with a smaller force when opening the image reading apparatus, and additionally, it is possible to suppress damage of the image reading apparatus or the recording mechanism portion since inertia is also small when closing the image reading apparatus.

In addition, in a case where a so-called free-stop mechanism which holds the image reading apparatus by a predetermined opening angle is provided, it is possible to hold the image reading apparatus by a small force, and to achieve low costs or light weight of the free-stop mechanism.

BRIEF DESCRIPTION OF THE DRAWINGS

The invention will be described with reference to the accompanying drawings, wherein like numbers reference like elements.

FIG. 14 is an X-axis sectional view of the vicinity of the biasing mechanism.

DESCRIPTION OF EXEMPLARY EMBODIMENTS

Example 1

First, an overview of an image reading apparatus and a recording apparatus including the image reading apparatus according to one example of the invention will be described. In the example, an example of the recording apparatus includes an ink jet type printer (hereinafter, simply referred to as a printer).

Figure 1:
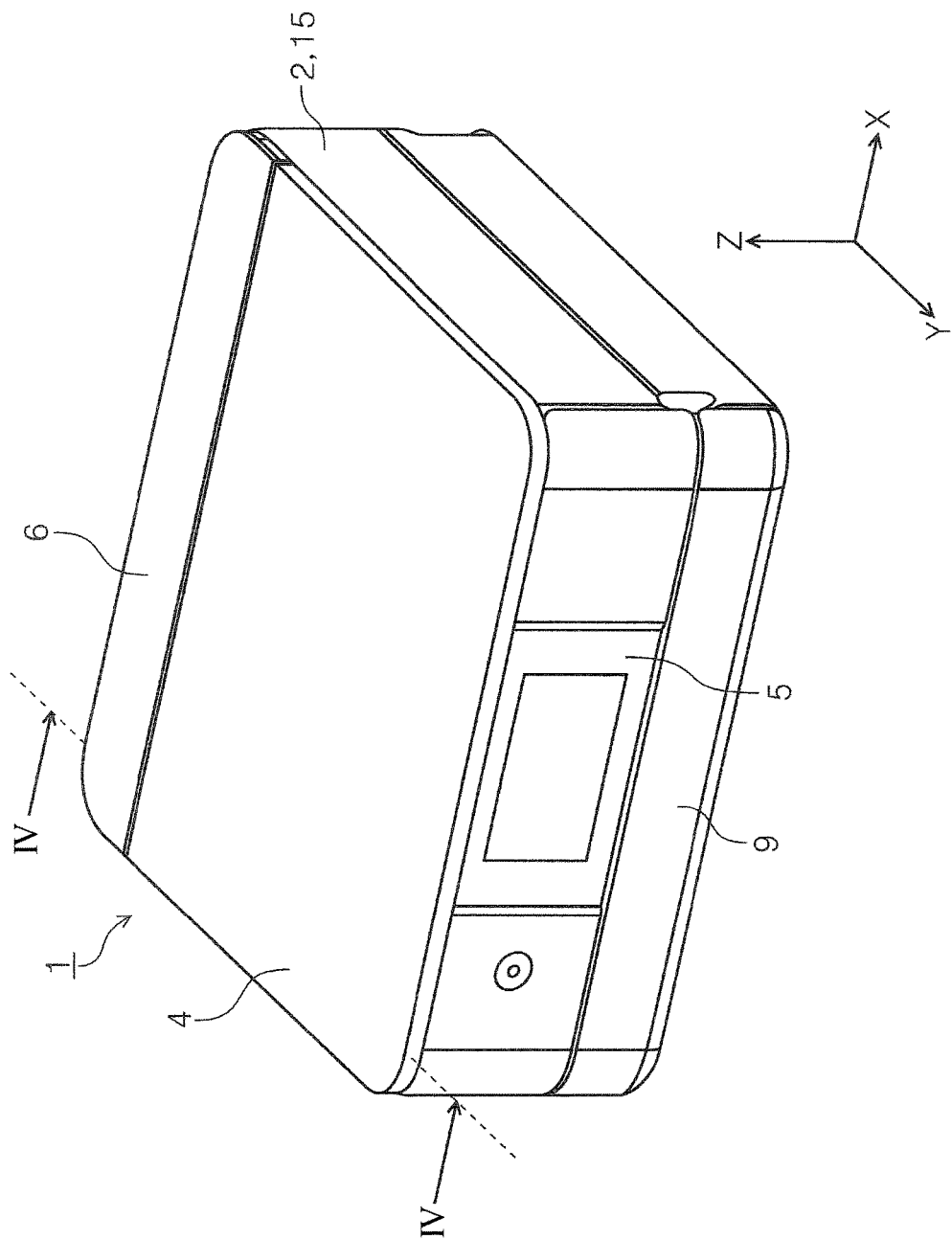
FIG. 1 is an external perspective view of a printer according to the invention.
Figure 2:
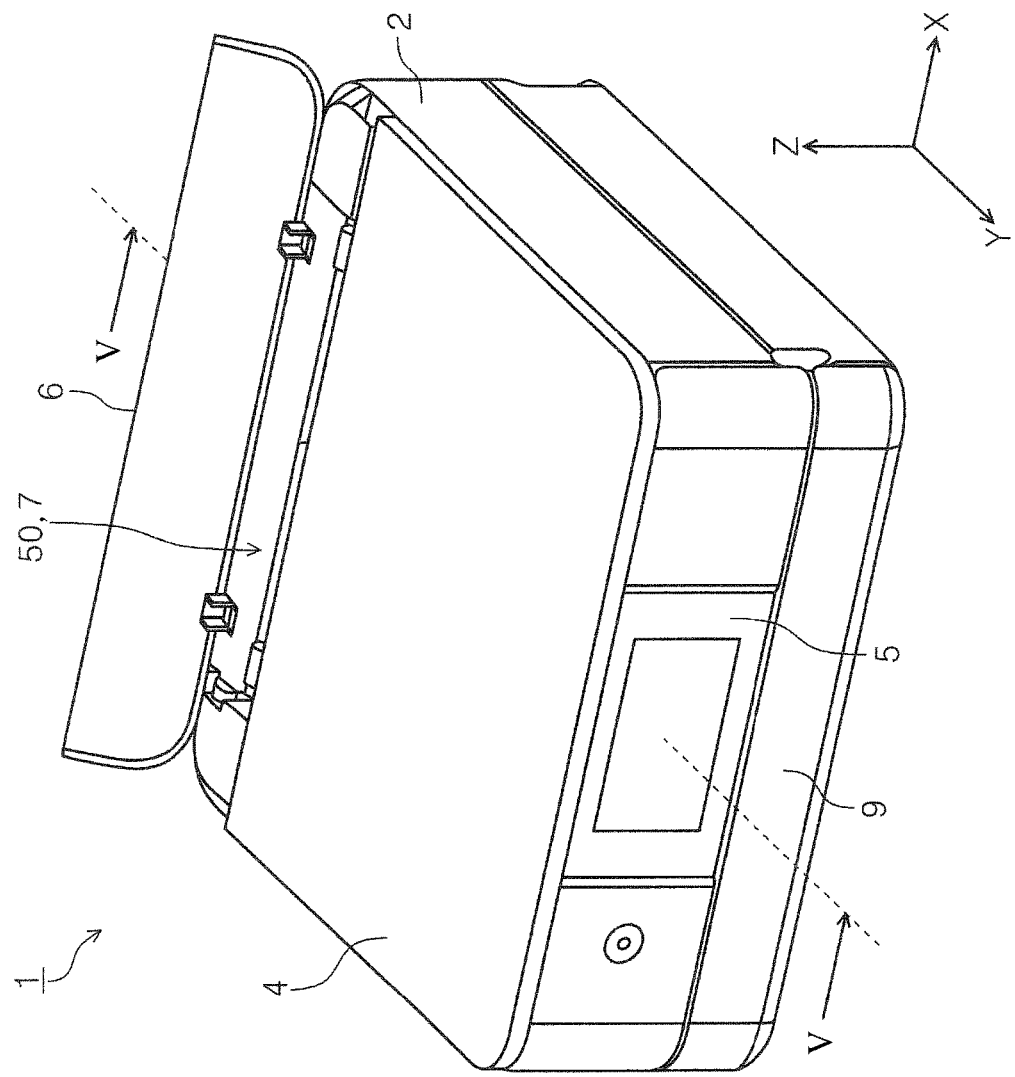
FIG. 2 is an external perspective view illustrating a state where a manual feed cover is open in the printer according to the invention.
Figure 3:
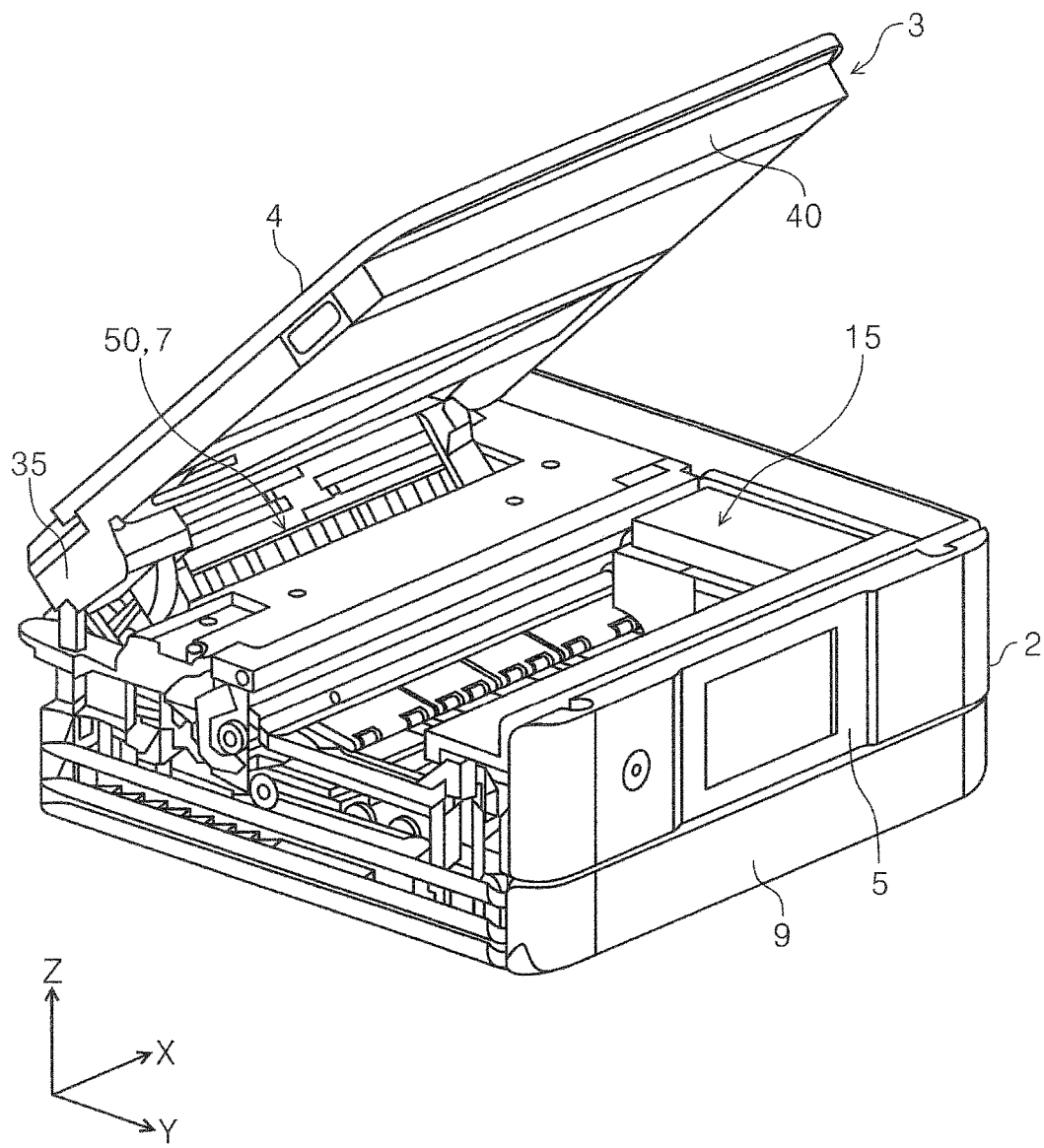
FIG. 3 is a perspective view illustrating a state where an image reading apparatus is open in the printer according to the invention.
Figure 4:
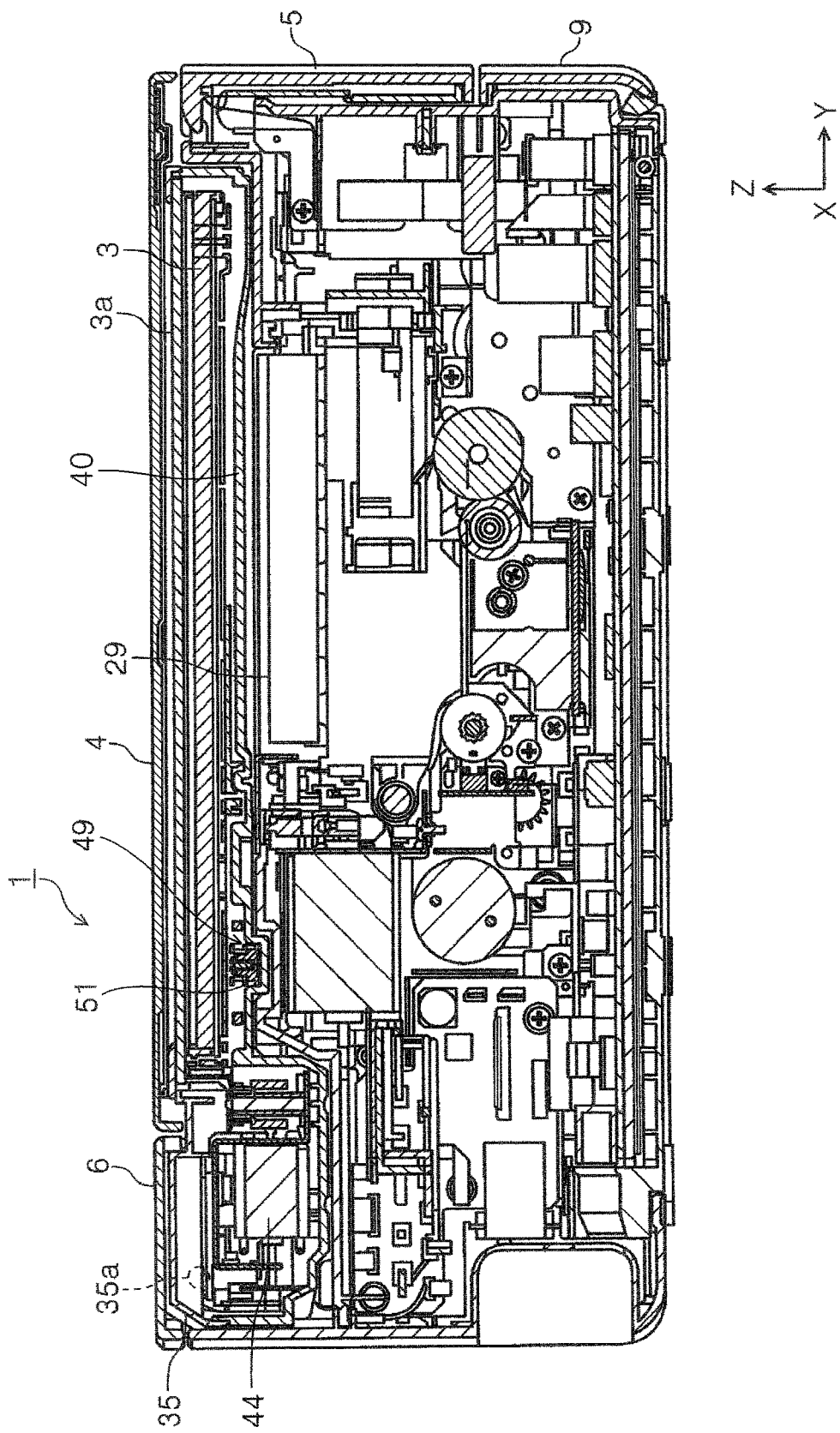
FIG. 4 is a sectional view taken along an arrow IV-IV of FIG. 1.
Figure 5:
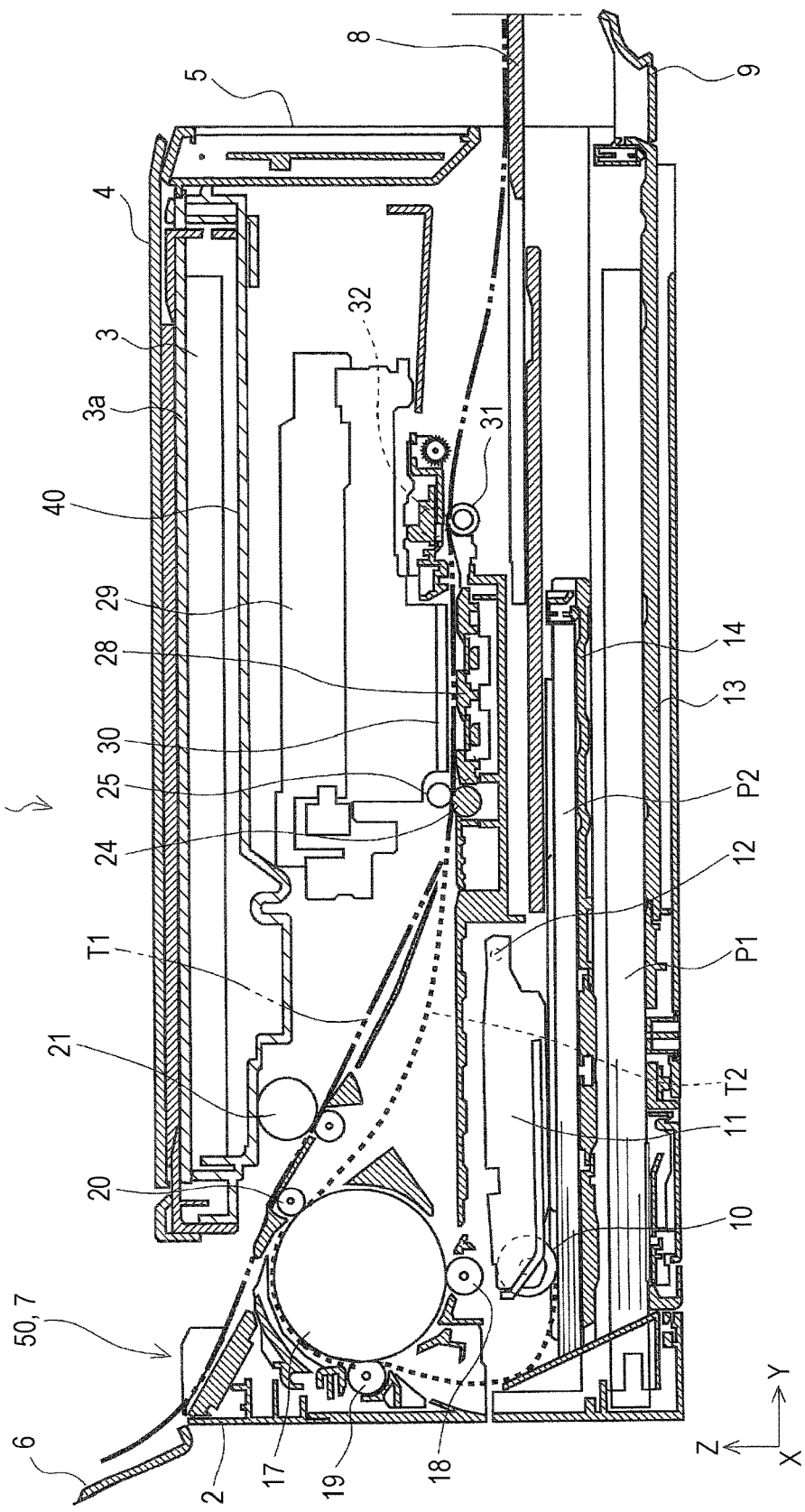
FIG. 5 is a sectional view taken along an arrow V-V of FIG. 2.
Figure 6:
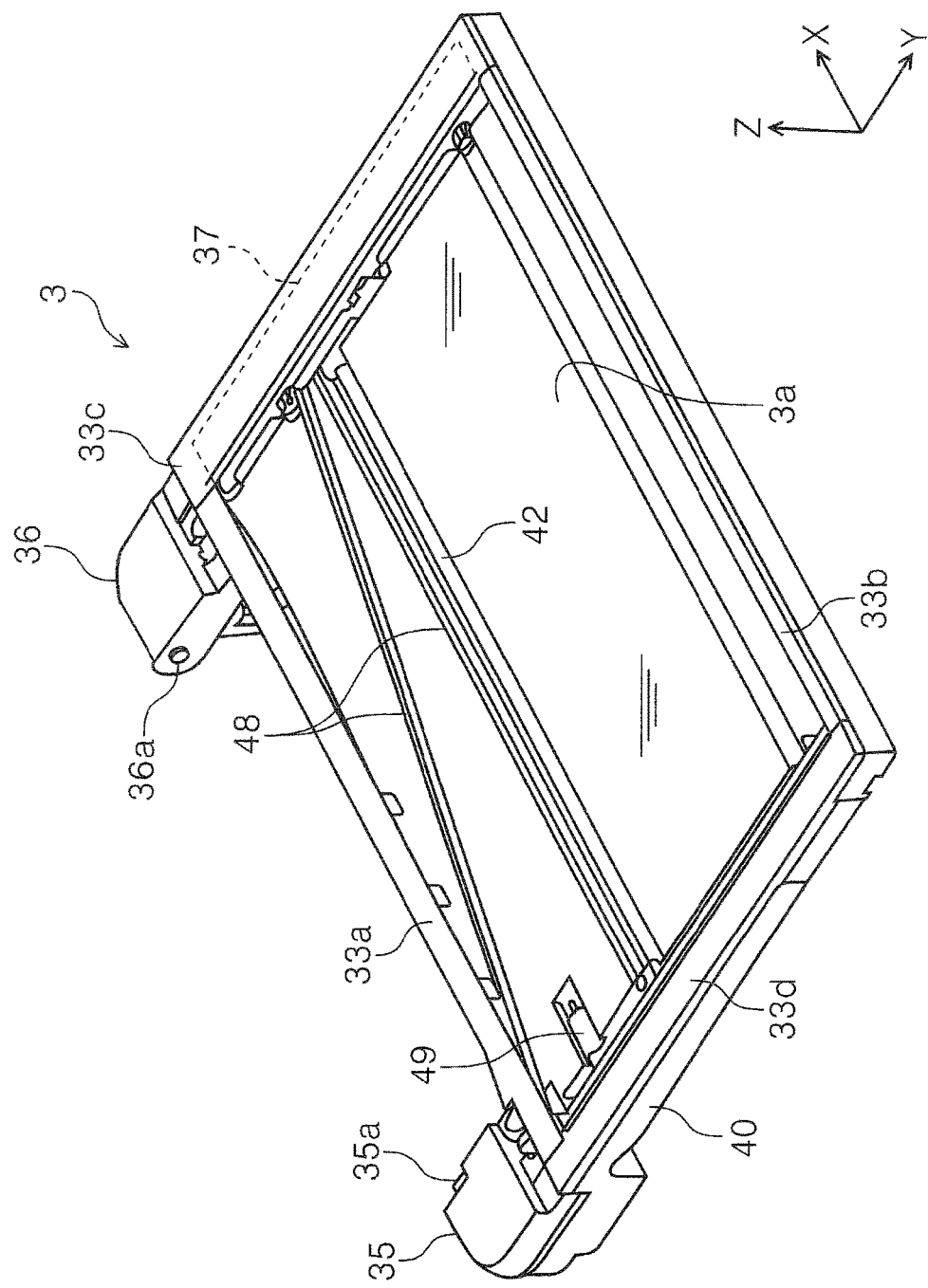
FIG. 6 is a perspective view of the image reading apparatus.
Figure 7:
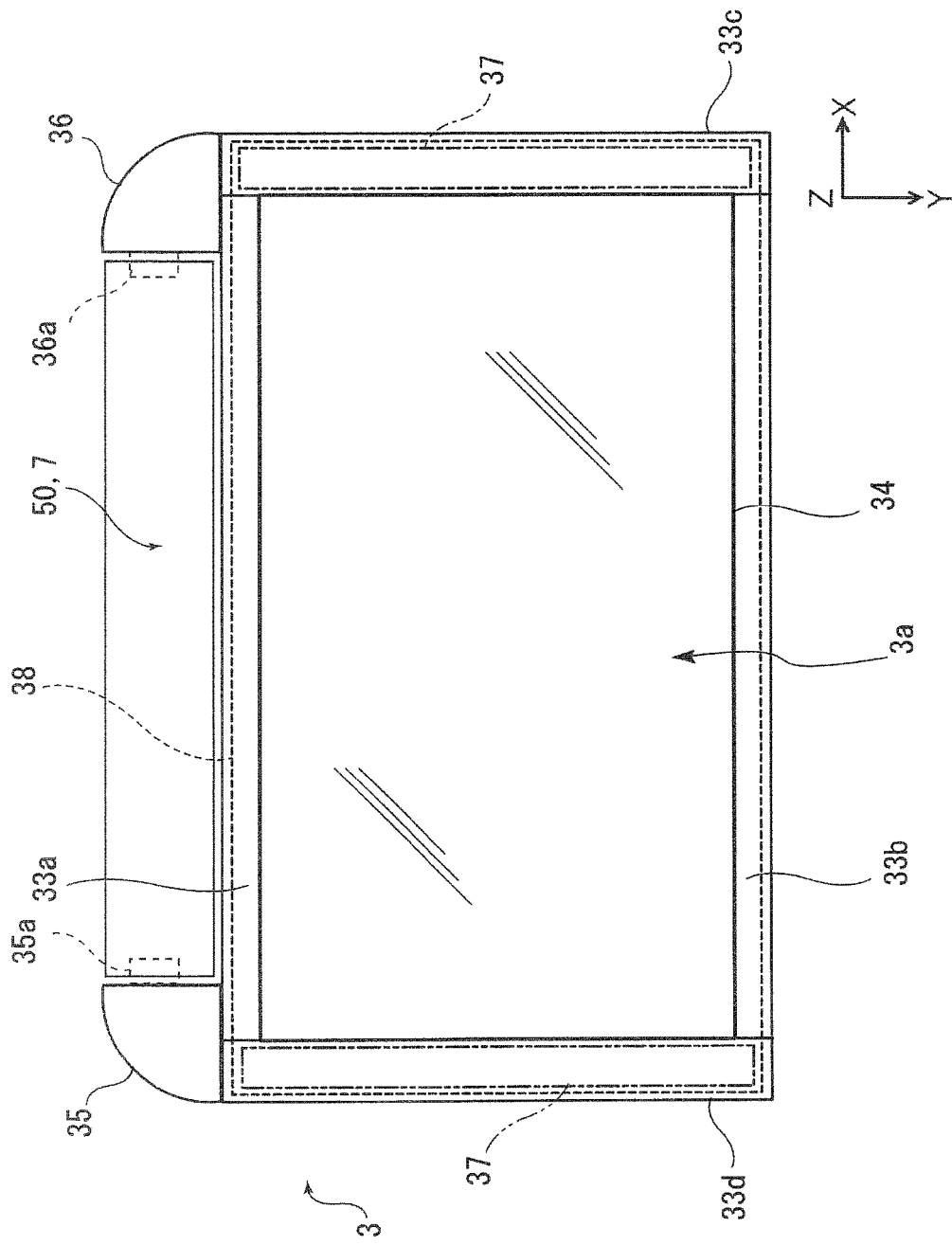
FIG. 7 is a plan view of the image reading apparatus.

FIG. 1 is an external perspective view of the printer according to the invention. FIG. 2 is an external perspective view illustrating a state where a manual feed cover is open in the printer according to the invention. FIG. 3 is a perspective view illustrating a state where an image reading apparatus is open in the printer according to the invention. FIG. 4 is a sectional view taken along an arrow IV-IV of FIG. 1. FIG. 5 is a sectional view taken along an arrow V-V of FIG. 2. FIG. 6 is a perspective view of the image reading apparatus. FIG. 7 is a plan view of the image reading apparatus.

Figure 8:
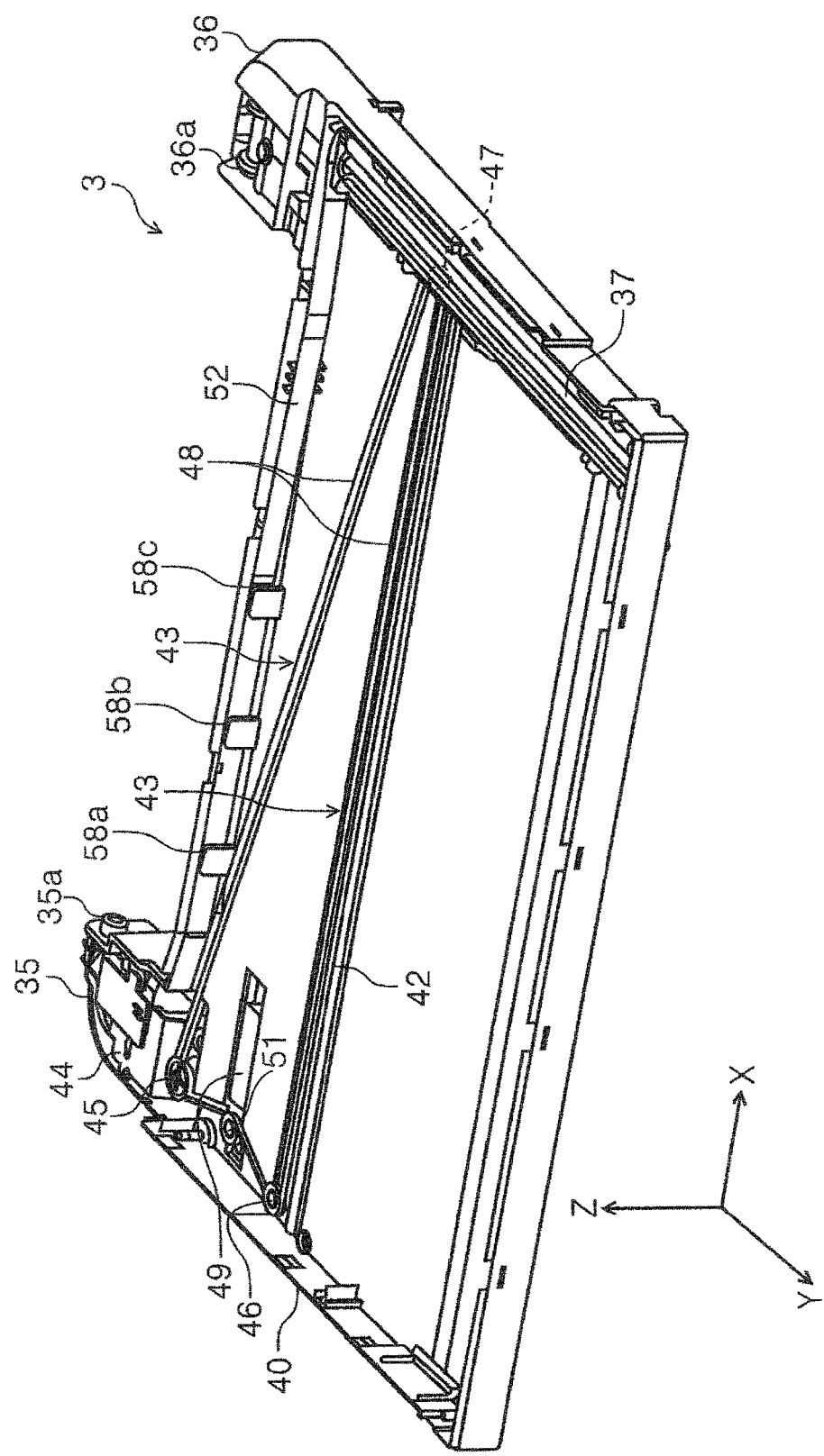
FIG. 8 is a perspective view illustrating a state where a document stand is removed in the image reading apparatus.
Figure 9:
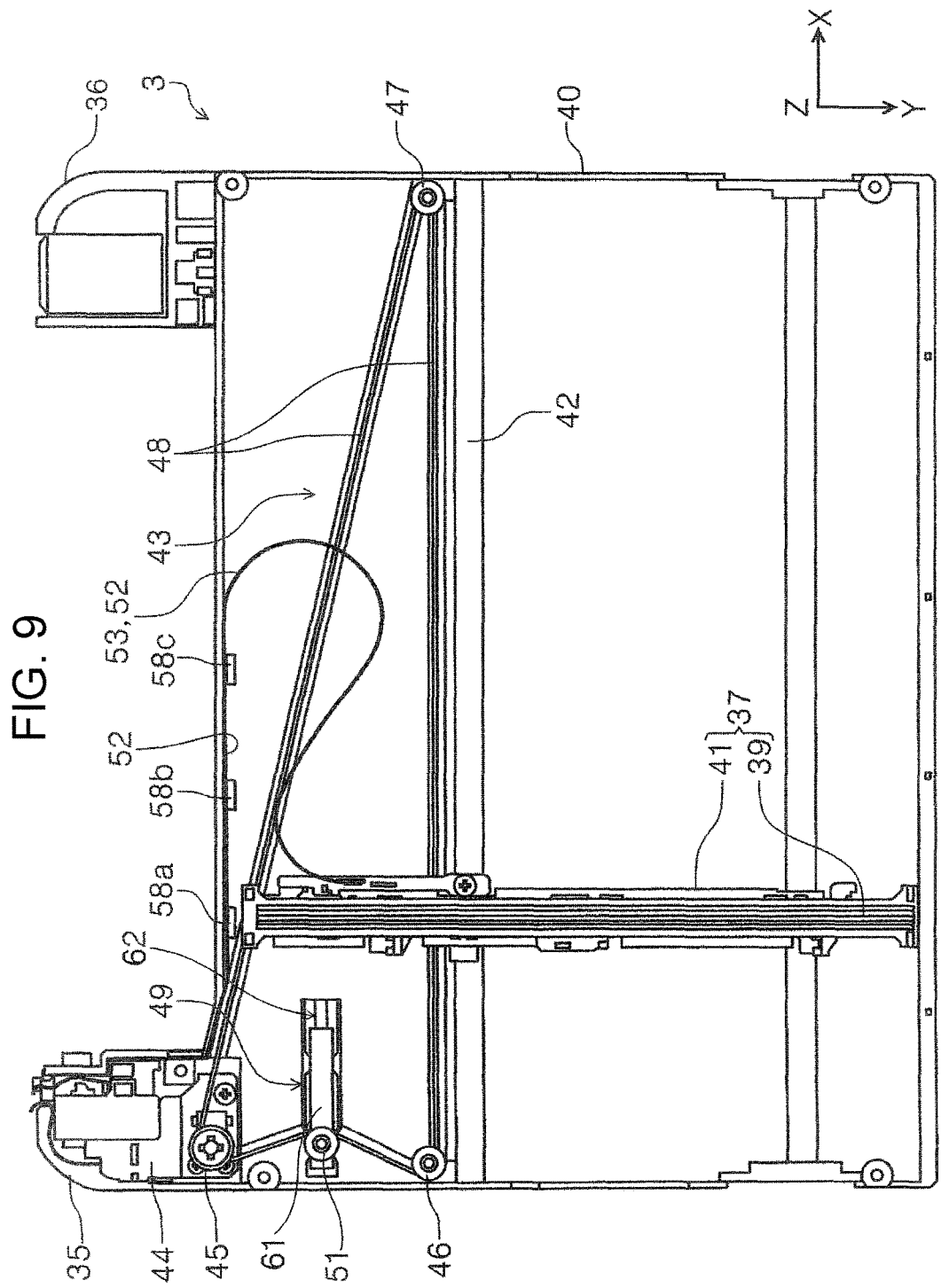
FIG. 9 is a plan view illustrating a state where the document stand is removed in the image reading apparatus.
Figure 10:
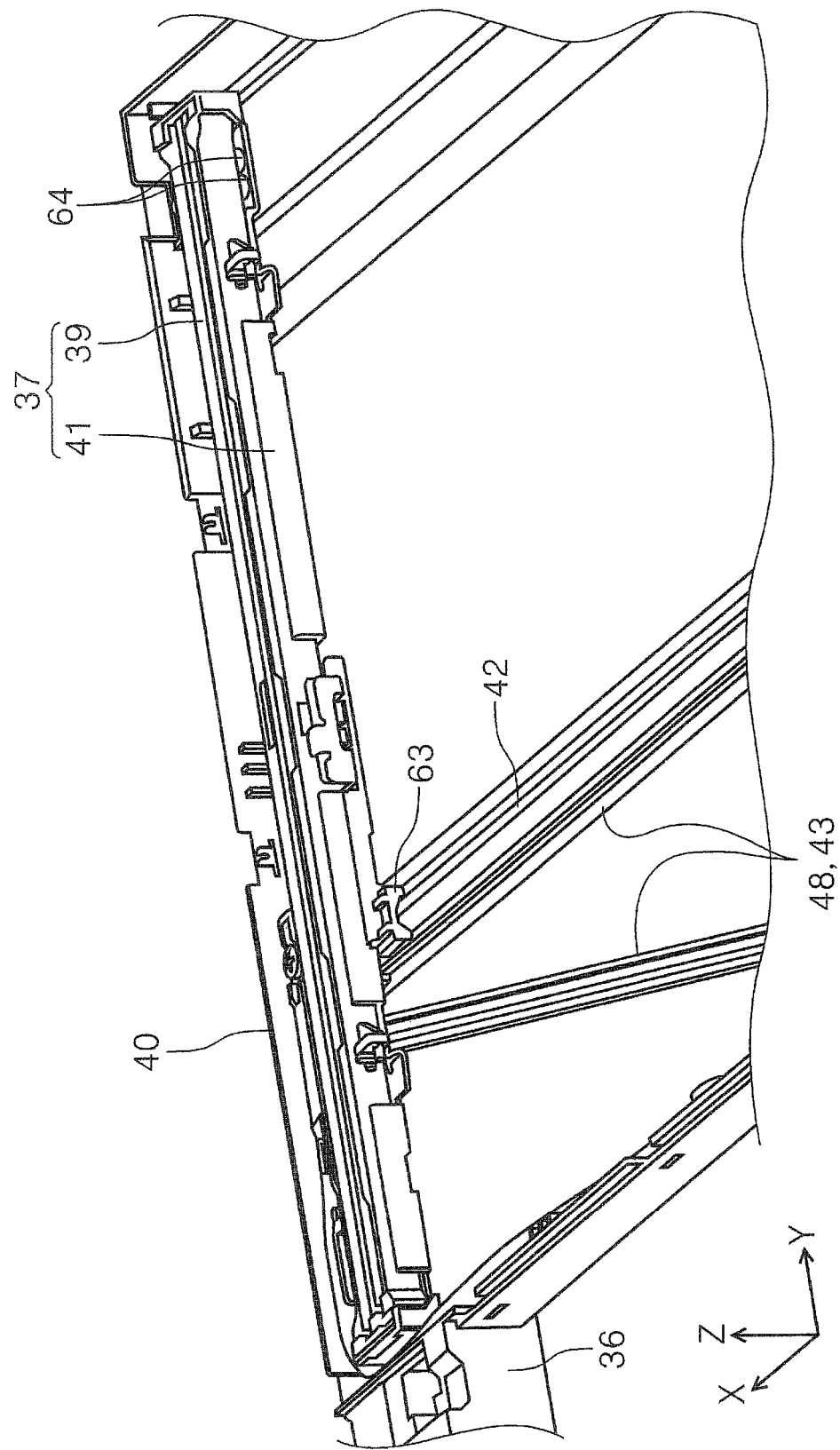
FIG. 10 is a perspective view illustrating a reading unit provided in an image reading apparatus main body.
Figure 11:
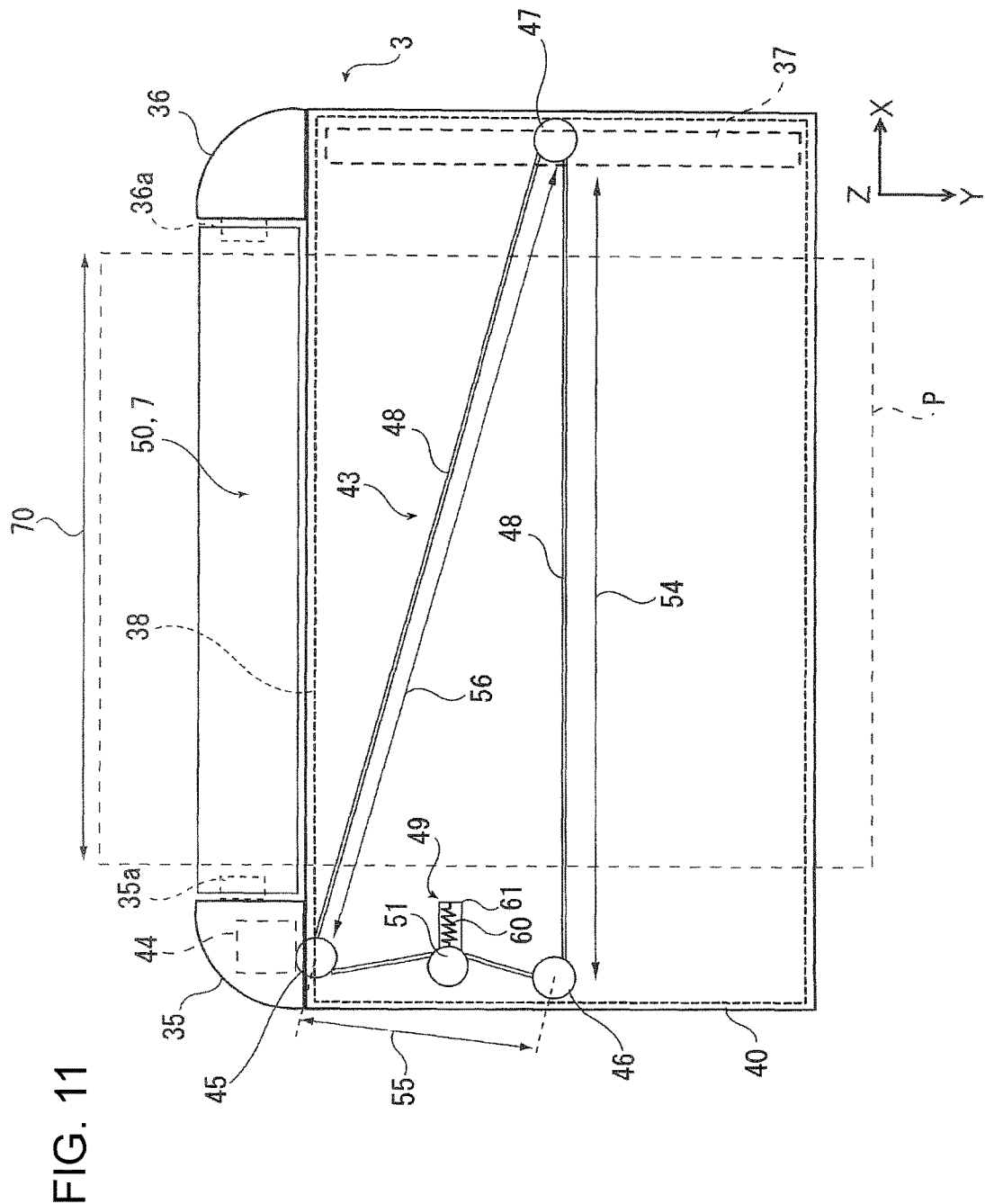
FIG. 11 is a schematic configuration view of a moving mechanism of the reading unit.
Figure 12:
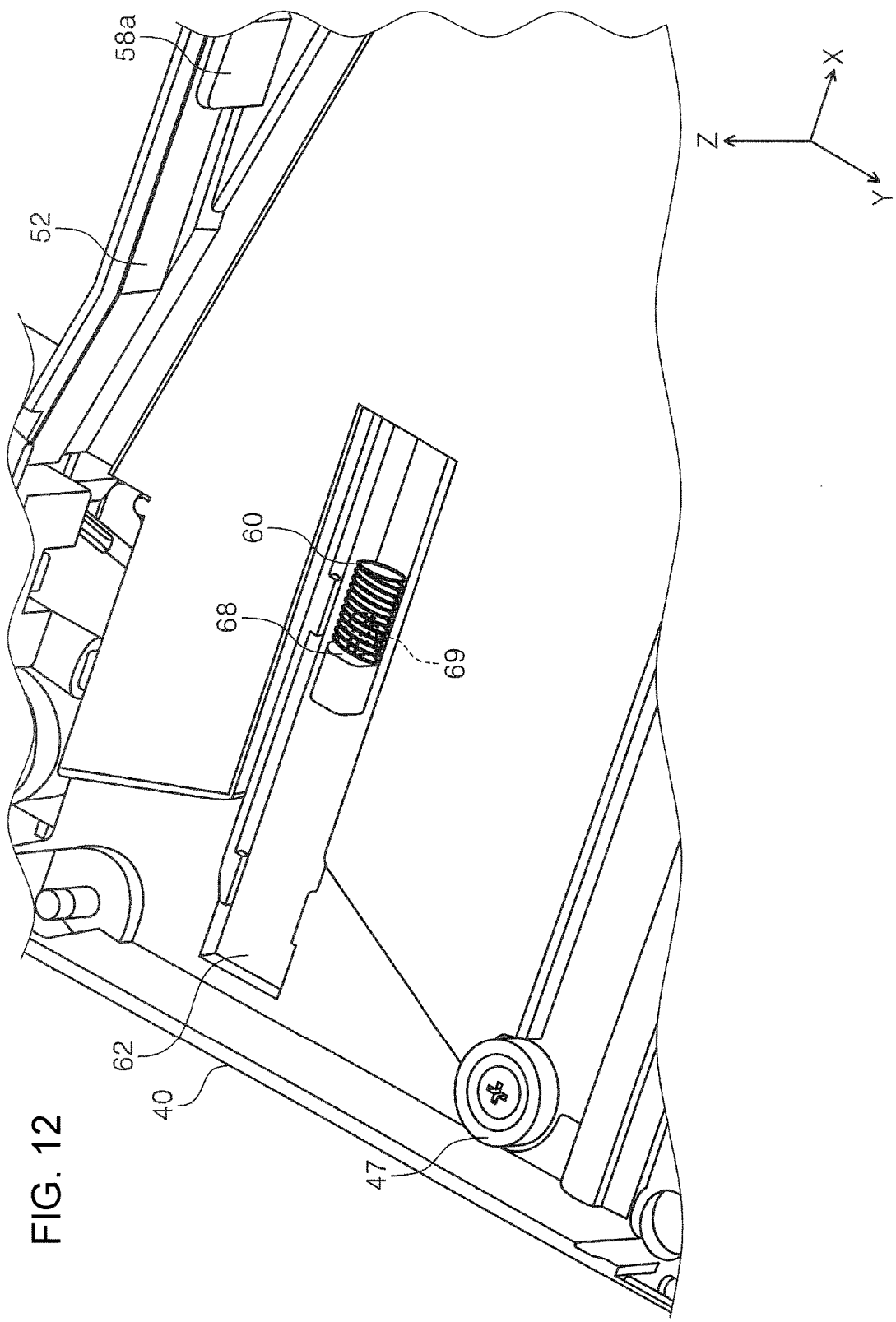
FIG. 12 is a perspective view illustrating a configuration of a biasing mechanism.
Figure 13:
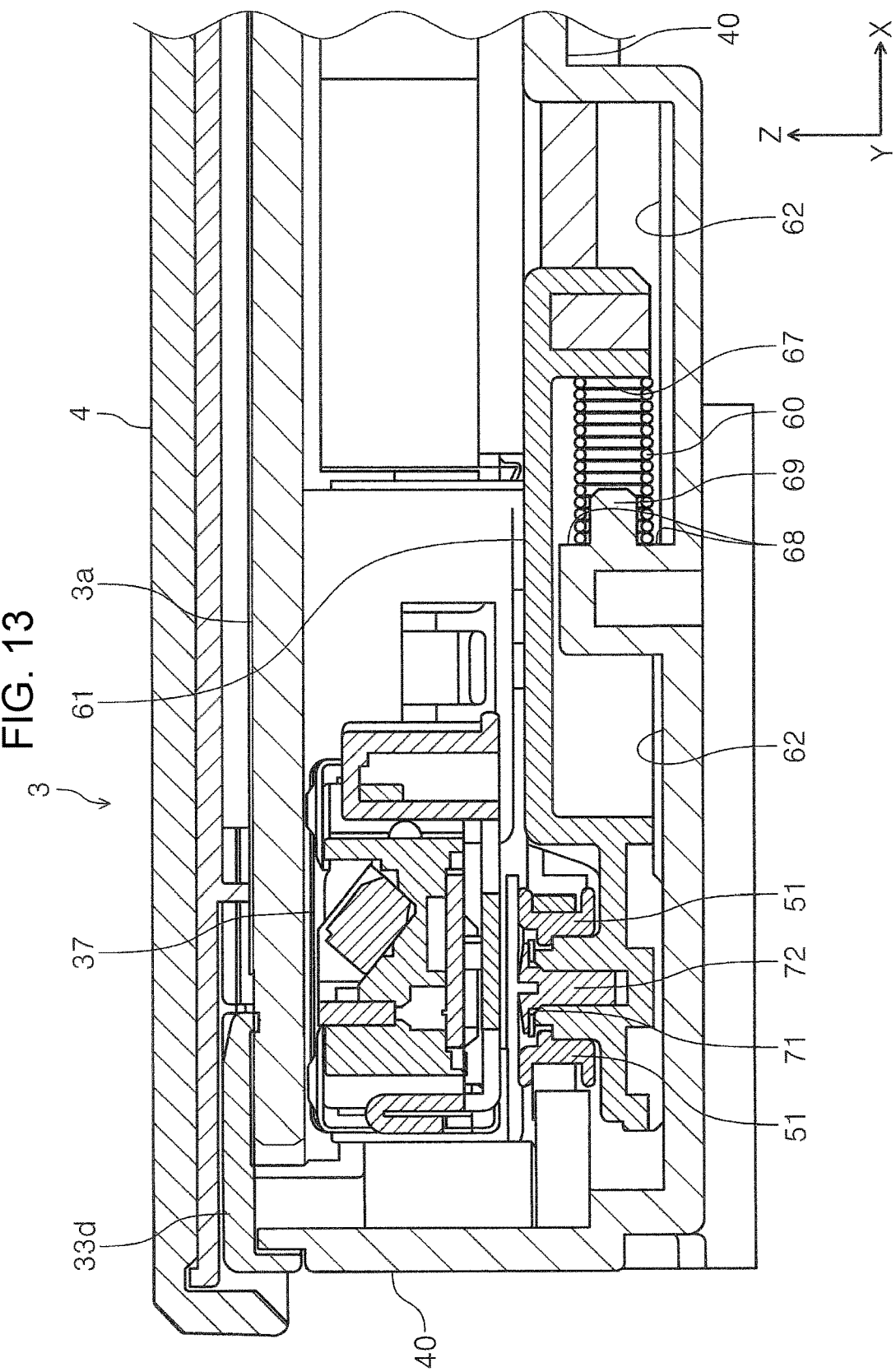
FIG. 13 is a Y-axis sectional view of the vicinity of the biasing mechanism.

FIG. 8 is a perspective view illustrating a state where a document stand is removed in the image reading apparatus. FIG. 9 is a plan view illustrating a state where the document stand is removed in the image reading apparatus. FIG. 10 is a perspective view illustrating a reading unit provided in an image reading apparatus main body. FIG. 11 is a schematic configuration view of a moving mechanism of the reading unit. FIG. 12 is a perspective view illustrating a configuration of a biasing mechanism. FIG. 13 is a Y-axis sectional view of the vicinity of the biasing mechanism. FIG. 14 is an X-axis sectional view of the vicinity of the biasing mechanism.

Regarding Entire Configuration of Printer

Hereinafter, the entire configuration of a printer 1 will be schematically described.

The printer 1 (FIG. 1) according to the invention includes: a recording mechanism portion 15 configured of a recording unit (recording head 30 which will be described later, refer to FIG. 5) which performs ink jet recording on a paper sheet that is an example of a recording medium in a recording mechanism portion main body 2; and an image reading apparatus 3 (FIG. 3) which is provided in an upper portion of the recording mechanism portion main body 2 and reads a document. In other words, the printer 1 is configured as a multifunction machine having a function of a scanner in addition to a function of ink jet recording. Furthermore, FIG. 3 illustrates a state where an exterior of a side surface of the recording mechanism portion 15 is removed in the printer 1.

Furthermore, in an X-Y-Z coordinate system illustrated in each drawing, the X direction is the scanning direction of a recording head, and the Y direction is the apparatus depth direction. The Z direction is the gravitational direction, and indicates the apparatus height direction. In addition, a +Y direction side is an apparatus front surface side, and a −Y direction side is an apparatus rear surface side. In addition, a right side when viewed from the apparatus front surface side is +X direction, and a left side is the −X direction. In addition, the +Z direction is an upper part of the apparatus (including an upper portion, an upper surface or the like), and the −Z direction side is a lower part of the apparatus (including a lower portion, a lower surface or the like).

In addition, hereinafter, the transport direction (+Y direction side) in which the paper sheet is transported in the printer 1 is referred to as a "downstream side", and the direction (−Y direction) opposite thereto is referred to as an "upstream side".

The image reading apparatus 3 (FIG. 3) is provided to be rotatable with respect to the recording mechanism portion main body 2 of the recording mechanism portion 15, and by rotating, a state (FIG. 1) where the upper portion of the recording mechanism portion 15 is closed and a state (FIG. 3) where the recording mechanism portion 15 is open, can be obtained. A configuration of the image reading apparatus 3 will be described in more detail later.

Furthermore, the image reading apparatus 3 includes a cover 4 (FIG. 1) which is openable and closable in an upper portion thereof, and the cover 4 is configured to open and close a document stand 3a (FIGS. 5 and 6). In addition, a document pressing mat (not illustrated) formed of an elastic material (for example, spongy) is provided in the cover 4, and when the cover 4 is closed, the document loaded on the document stand 3a is pressed by the document pressing mat, and a reading surface tightly adheres to the document stand 3a.

On the apparatus front surface, a reference numeral 5 is an operation panel including a power source button, an operation button which performs various types of printing setting and recording, and a display portion which performs preview display of printing setting contents or printing image.

In addition, on the apparatus front surface, a reference numeral 9 is an openable and closable cover which is provided on a lower step side tray 13 (FIG. 5). In addition, as illustrated in FIG. 5, by opening a cover 9, the lower step side tray 13, an upper step side tray 14, and a paper discharge receiving tray 8 are configured to be exposed.

The paper discharge receiving tray 8 is provided to obtain a state (FIG. 1) of being accommodated in the recording mechanism portion main body 2 by a motor which is not illustrated, and a state (FIG. 5) of protruding to the front side of the recording mechanism portion main body 2, and by achieving the state of protruding to the front side of the recording mechanism portion main body 2, it is possible to receive the paper sheet discharged by performing the recording.

The lower step side tray 13 and the upper step side tray 14 provided in the upper portion thereof can accommodate a plurality of paper sheets, and each of the lower step side tray 13 and the upper step side tray 14 is independent from each other, and is attachable to and detachable from the recording mechanism portion main body 2. In addition, even when one side is in a state where the paper sheet is not mounted yet, when the other side is in a state where the paper sheet is mounted, the paper sheet can be sent out from the tray on which the paper sheet is mounted.

In addition, in a rear upper portion of the recording mechanism portion main body 2, a reference numeral 6 is an openable and closable manual feed cover, and by opening the manual feed cover 6 as illustrated in FIG. 2, the paper supply is performed by manual paper supply in which a manual feed tray 7 is used.

Furthermore, the paper transporting path in the recording mechanism portion 15 of the printer 1 will be described later.

Regarding Configuration of Image Reading Apparatus

Next, a configuration of the image reading apparatus 3 will be described.

As described above, in the upper portion of the recording mechanism portion 15, the image reading apparatus 3 (FIG. 3) is linked to be rotatable to the recording mechanism portion main body 2 of the recording mechanism portion 15, and as the image reading apparatus 3 rotates, the upper portion of the recording mechanism portion 15 is opened and closed.

More specifically, the image reading apparatus 3 is linked to be rotatable to the recording mechanism portion 15 in a first linking portion 35 and a second linking portion 36. Rotation shafts 35a and 36a are provided in each of the first linking portion 35 and the second linking portion 36, the rotation shafts 35a and 36a are pivotally supported around a bearing which is not illustrated and is provided on the recording mechanism portion main body 2 side, and the image reading apparatus 3 rotates to open and close the upper portion of the recording mechanism portion 15.

The image reading apparatus 3 is provided with the document stand 3a (FIG. 6), and an upper surface of the document stand 3a becomes a document loading surface on which the document is loaded. The document stand 3a is a transparent glass plate in the example. The periphery of the document stand 3a is configured of a plurality of frames 33a, 33b, 33c, and 33d (FIGS. 6 and 7), and a rectangular region (FIG. 7, reference numeral 34) divided by the frames 33a, 33b, 33c, and 33d becomes a document reading region 34 which can perform reading by a reading unit 37 which moves in a housing 40 that configures the apparatus main body of the image reading apparatus 3.

In other words, in the example, the image reading apparatus 3 is a flat-bed type scanner, and on a lower side of the document stand 3a, the reading unit 37 is provided to be movable relatively to the document stand 3a.

The reading unit 37 is provided in the housing 40, extends in the main scanning direction (Y-axis direction), and the reading unit 37 is configured of a moving mechanism 43 which will be described later to be movable in the auxiliary scanning direction (X-axis direction) intersecting with the main scanning direction. Furthermore, in the example, the main scanning direction corresponds to the short side direction of the document reading region, and the auxiliary scanning direction corresponds to a long side direction of the document reading region.

The reading unit 37 moves to a position (a position of the reading unit 37 illustrated by a two-dot chain line in FIG. 7) on a −X side from a position (a position of the reading unit 37 illustrated by a one-dot chain line in FIG. 7) on a +X side of the document reading region 34, in the moving direction (X-axis direction). Therefore, the rectangular region illustrated by a dotted line with a reference numeral 38 is a moving region 38 of the reading unit 37.

Furthermore, a cable 52 (FIG. 8) provided along an inner wall surface on the −Y side of the housing 40 is fixed to the inner wall surface by fixing portions 58a, 58b, and 58c. In the cable 52, a part (movable portion 53) further on the +X side than the fixing portion 58c is in a state of a pulley. In addition, as illustrated in FIG. 9, when the reading unit 37 moves, the movable portion 53 is configured to be deformable in accordance with the movement of the reading unit 37.

The reading unit 37 is configured of a reading sensor 39 and a sensor carriage 41 which holds the reading sensor 39 (FIG. 10).

The reading sensor 39 is an optical sensor which is provided with a light source and a light receiving portion which are not illustrated, emits light from the light source to the document loaded on the document stand 3a, receives the reflected light from the document by the light receiving portion, and reads the information of the document. For example, it is possible to use a charge coupled devices (CCD) type or a contact image sensor (CIS) type optical sensor.

The sensor carriage 41 which configures the reading unit 37 (FIG. 10) is configured to be engaged with a guide portion 42 to be movable in an engagement portion 63 provided in the lower portion thereof, to be guided to the guide portion 42, and to slide and move in the auxiliary scanning direction (X-axis direction) by the power of a motor 44 (FIG. 8) that serves as a power source which drives the sensor carriage 41.

More specifically, the sensor carriage 41 is driven by the moving mechanism 43 (FIGS. 8 and 9) by driving a belt which will be described later, is guided to the guide portion 42, and slides and moves in the X-axis direction. In other words, the reading unit 37 is configured to move by the power of the motor 44.

Furthermore, in FIG. 10, a reference numeral 64 is a spring which is provided between the reading sensor 39 and the sensor carriage 41, and presses the reading sensor 39 to a rear surface of the document stand 3a.

As illustrated in FIGS. 8 and 9, the moving mechanism 43 of the sensor carriage 41 (reading unit 37) includes a driving pulley 45 driven by the motor 44, a first driven pulley 46 and a second driven pulley 47 which are a plurality of driven pulleys that are rotatably driven by the rotation of the driving pulley 45, and an endless belt 48 which is engaged and rotates between the pulleys.

The first driven pulley 46 and the second driven pulley 47 are provided to be fixed to the housing 40, and form a first belt section 54 (FIG. 11) which extends along the auxiliary scanning direction. In the example, the first driven pulley 46 and the second driven pulley 47 are disposed in the vicinity of the end portion on one side of the guide portion 42, and in the vicinity of the end portion on the other side. The reading unit 37 is fixed to the endless belt 48 in the first belt section 54 via an attachment portion which is not illustrated and is provided on a lower surface of the sensor carriage 41. Therefore, the first belt section 54 becomes an attraction section which attracts the reading unit 37.

In the example, since the reading unit 37 is attracted in the attraction section (first belt section 54) provided near the guide portion 42 (refer to FIG. 9), it is possible to smoothly move the reading unit 37.

In addition, the driving pulley 45 is provided at a position separated from the first belt section 54 which is the attraction section in the main scanning direction. In the example, the driving pulley 45 is positioned on a −Y direction side (FIG. 11).

As the motor 44 which rotates the driving pulley 45 is driven, the endless belt 48 rotates, and the sensor carriage 41 is attracted to the endless belt 48 and reciprocates in the X-axis direction.

In addition, the moving mechanism 43 includes a biasing mechanism 49 which is configured of a compression spring 60 (FIGS. 11 and 12) which serves as a biasing unit that imparts tension to the endless belt 48. The biasing mechanism 49 is provided at a position at which a biasing force of the compression spring 60 is applied to the belt section excluding the attraction section (first belt section 54) in the endless belt 48. In the example, the biasing mechanism 49 is provided in a second belt section 55 (FIG. 11) between the driving pulley 45 and the first driven pulley 46.

Next, a configuration of the biasing mechanism 49 will be described. In the example, the biasing mechanism 49 is configured of the compression spring 60 which shows the biasing force as described above.

The compression spring 60 is provided in order to bias a holder 61 which supports a third driven pulley 51 which is rotatably driven, and the third driven pulley 51 is configured to apply the tension to the endless belt 48 by receiving the biasing force of the compression spring 60 via the holder 61.

The third driven pulley 51 is pivotally supported to be rotatable in a shaft 71 (FIG. 13) provided in the holder 61. In FIG. 13, a reference numeral 72 is a screw for preventing slippage for making the third driven pulley 51 not slipped from the shaft 71.

The third driven pulley 51 is provided to be retreatable in the biasing direction (the X-axis direction in the example) by the compression spring 60. More specifically, as illustrated in FIGS. 9 and 13, the holder 61 which supports the third driven pulley 51 is stored in a recess portion 62 formed in the housing 40, and is configured to be slidable in the X-axis direction in the recess portion 62. Furthermore, FIG. 12 illustrates a state where the recess portion 62 is exposed before storing the holder 61.

As illustrated in FIG. 14, the holder 61 is provided with a sliding portion 65, and in the recess portion 62, a sliding groove 66 which slides being engaged with the sliding portion 65, extends in the sliding direction (X-axis direction).

In addition, as the holder 61 is provided in the recess portion 62, the holder 61 does not protrude on the moving region side of the reading unit 37.

The holder 61 is configured to be capable of storing the compression spring 60 on the inside thereof (FIG. 13), and the compression spring 60 shows the biasing force between a first abutting portion 67 on the holder 61 side and a second abutting portion 68 provided in the recess portion 62. Accordingly, the holder 61 is biased in the +X direction.

Furthermore, in the second abutting portion 68 on the recess portion 62 side of the housing 40, a projection portion 69 which serves as a positioning portion of the compression spring 60 is provided.

The third driven pulley 51 is provided on the outside of the endless belt 48 which is engaged and rotates (FIG. 11), and as the holder 61 is biased in the +X direction, the tension is applied to the endless belt 48 by the third driven pulley 51.

In this manner, by covering the compression spring 60 with the holder 61, the compression spring 60 is not exposed, and it is possible to make an excellent appearance.

In the biasing mechanism 49, the biasing unit is not limited to the compression spring 60, and a tension spring or a torsion spring can also be used. However, in a case of the compression spring 60, the biasing force is imparted to the third driven pulley 51 via the holder 61, and it is possible to easily realize a configuration in which the compression spring 60 is covered with the holder 61. In addition, the biasing unit is not covered with the holder 61, and a configuration of being exposed is also possible.

It is desirable that the biasing mechanism 49 is provided at a position at which the biasing force is applied to the belt section (in the example, the second belt section 55) of the distance is the shortest in the endless belt 48.

Accordingly, it is possible to reduce a movable region of a movable member (third driven pulley 51) when applying the tension to the endless belt 48.

Furthermore, the biasing mechanism 49 can also be provided between the driving pulley 45 and the second driven pulley 47 (third belt section 56) in addition to the second belt section 55.

As the moving mechanism 43 is configured as described above, the following action effect is obtained.

In other words, the first belt section 54 between the two driven pulleys (the first driven pulley 46 and the second driven pulley 47) which are provided to be fixed is the attraction section, and in the driving pulley 45 which is provided at a position separated from the attraction section in the main scanning direction, the first driven pulley 46, and the endless belt 48 which is engaged and rotates with the second driven pulley 47, the biasing force of the biasing mechanism 49 is applied to the belt section (second belt section 55) excluding the attraction section. Therefore, it is not necessary to set an operation range in the auxiliary scanning direction (X-axis direction) in the first driven pulley 46 or the second driven pulley 47 for applying the tension to the endless belt 48, and it is possible to provide the moving mechanism 43 in a small space in the auxiliary scanning direction. Accordingly, it is possible to reduce the size of the image reading apparatus 3.

In addition, in the example, the driving pulley 45 is provided at the position of not protruding to the outside from the first driven pulley 46 and the second driven pulley 47 in the auxiliary scanning direction (X-axis direction). Therefore, it is possible to provide the moving mechanism 43 in a smaller space.

Accordingly, it is possible to make the size of the image reading apparatus 3 in the X-axis direction substantially the same as that of the moving region of the reading unit 37.

Furthermore, the driving pulley 45 can also have a certain configuration on the outside of the first driven pulley 46 and the second driven pulley 47 in the auxiliary scanning direction.

In addition, as illustrated in FIG. 11, the biasing mechanism 49 including the compression spring 60 (biasing unit) may be disposed to avoid a transport region 70 of a paper sheet P in the medium width direction (X-axis direction) intersecting with the transport direction of the paper sheet P.

In the recording mechanism portion 15, a configuration member, such as a transport unit, such as a second feeding roller 21 (FIG. 5), or a carriage 29 (FIGS. 4 and 5) provided with the recording head 30, is provided in the transport region 70 of the paper sheet P.

Meanwhile, in a case where the image reading apparatus 3 is provided in the upper portion of the recording mechanism portion 15, it is necessary to provide the biasing mechanism 49 at the height which does not interfere with the configuration member which is the recording mechanism portion 15 positioned at a lower part thereof.

Since the biasing mechanism 49 including the compression spring 60 is disposed to avoid the transport region of the paper sheet P in which the second feeding roller 21 or the recording head 30 (carriage 29) is disposed, in the medium width direction intersecting with the transport direction of the paper sheet P, a degree of freedom of layout of the biasing mechanism 49 is improved.

Next, the motor 44 is disposed at a position of the first linking portion 35 disposed on the outside of the moving region 38 when the moving region 38 of the reading unit 37 is viewed in a plan view (FIG. 7).

There are many cases where the motor 44 which is a power source of the reading unit 37 in the image reading apparatus 3 is a relatively heavy object (heavy). As the motor 44 which is a heavy object is disposed in the first linking portion 35 in which the rotation shaft 35a of the image reading apparatus 3 is provided, it is possible to open the image reading apparatus 3 by a small force when opening the image reading apparatus 3. In addition, since inertia is also small when closing the image reading apparatus, for example, it is possible to suppress a concern that the image reading apparatus 3 or the recording mechanism portion 15 is damaged by an impact or the like when closing the image reading apparatus 3.

Additionally, for example, in a case where a so-called free-stop mechanism which holds the image reading apparatus 3 by a predetermined opening angle is provided, since it is possible to hold the image reading apparatus 3 by a small force, it is possible to achieve low costs or light weight of the free-stop mechanism. Accordingly, this leads to low costs or light weight of the printer 1.

Furthermore, the motor 44 may be disposed at least in any of the first linking portion 35 and the second linking portion 36, and can also be disposed on the second linking portion 36 side.

In addition, since the motor 44 is disposed by using the first linking portion 35 at a configuration part for making it possible to rotate the image reading apparatus 3, it is possible to achieve reduction of the size of the apparatus.

Furthermore, the first linking portion 35 and the second linking portion 36 are divisions of a part of the housing 40 which configures an appearance of the image reading apparatus 3, and are a part linked to the recording mechanism portion main body 2.

In the example, the moving region 38 (refer to FIG. 7) of the reading unit 37 is large only as much as a region in which the reading unit 37 is positioned on both sides, with respect to the document reading region 34 which corresponds to the document (for example, an A4 size or a letter size) having the largest size which can be read, in the X-axis direction. The width in the X-axis direction of the housing 40 is the size which corresponds to that of the moving region 38 of the reading unit 37.

In addition, the recording mechanism portion 15 can perform the recording with respect to the paper sheet having the same size as that of the document having the largest size which can be read in the image reading apparatus 3, and a set port 50 (FIG. 7) of the paper sheet of the manual feed tray 7 sets a long side of the paper sheet to be oriented along the transport direction (Y-axis direction).

Therefore, the width in the X-axis direction of the set port 50 of the paper sheet is narrower than the width in the X-axis direction of the housing 40.

As illustrated in FIG. 4, in a case where the width sizes of the recording mechanism portion main body 2 and the housing 40 which are disposed to overlap up and down are the same, an external appearance is excellent, and it is possible to make a shape which is easily handled without unevenness, but since the width of the set port 50 is narrower than that of the housing 40, a surplus region can be made in the X-axis direction.

Here, in the example, the first linking portion 35 and the second linking portion 36 are configured as divisions provided in the surplus region in the X-axis direction of the set port 50.

Regarding Paper Transporting Path of Printer

Hereinafter, a paper transporting path in the recording mechanism portion 15 of the printer 1 will be described with reference to FIG. 5. First, feeding of the paper sheet from the manual feed tray 7 will be described, and then, feeding of the paper sheet from the lower step side tray 13 or the upper step side tray 14 provided in the bottom portion of the apparatus, will be described.

Furthermore, in FIG. 5, a feeding path T1 of a paper sheet P from the manual feed tray 7 is illustrated by a two-dot chain line. In addition, a feeding path T2 of the paper sheet P from the lower step side tray 13 or the upper step side tray 14 to the upstream side of a transport driving roller 24 is illustrated by a dot line.

The highest paper sheet set by a set port 50 of the manual feed tray 7, is picked up by the second feeding roller 21 and sent to the downstream side.

At a tip of the second feeding roller 21, the transport driving roller 24 driven to be rotated by the motor which is not illustrated, and a transport driven roller 25 which is rotated to be driven being in contact with the transport driving roller 24, are provided, and the paper sheet P is sent to a lower part of the recording head 30 by the rollers.

Next, the recording head 30 which discharges ink as a liquid is provided in the bottom portion of a carriage 29, and the carriage 29 is driven to reciprocate in the auxiliary scanning direction (X-axis direction) by the motor which is not illustrated.

At a position which opposes the recording head 30, a medium supporting member 28 which supports the transported paper sheet P is provided, and an interval (PG) between the paper sheet P and the recording head 30 is regulated by the medium supporting member 28.

In addition, on the downstream side of the medium supporting member 28, a discharge driving roller 31 which is driven to be rotated by the motor which is not illustrated, and a discharge driven roller 32 which is rotated to be driven being in contact with the discharge driving roller 31, are provided. The paper sheet P on which the recording is performed by the recording head 30 is discharged toward the above-described paper discharge receiving tray 8 by the rollers.

In addition, the printer 1 includes the lower step side tray 13 and the upper step side tray 14 in the bottom portion of the apparatus, and the paper sheets can be fed one by one from the lower step side tray 13 or the upper step side tray 14.

The upper step side tray 14 is configured to be provided to be slidable (displacement) between a feedable position (FIG. 5) and a retreating position (not illustrated) moved to the apparatus front surface side (the rightward direction in FIG. 5: the drawing-out direction side of the upper step side tray 14), to receive the power of the motor which is not illustrated, and to displace the feedable position and the retreating position.

Furthermore, in FIG. 5, respectively, a paper sheet accommodated in the lower step side tray 13 is illustrated by a reference numeral P1, and a paper sheet accommodated in the upper step side tray 14 is illustrated by a reference numeral P2 (hereinafter, in a case where it is not necessary to particularly distinguish, the paper sheet is referred to as "paper sheet P").

A first feeding roller (also called a pickup roller) 10 which is driven to be rotated by the motor which is not illustrated, is provided in a roller supporting member 11 (also called a pickup arm or an oscillation member) which oscillates around a rotation shaft 12, and when the upper step side tray 14 slides and is at a butting position on the most apparatus rear side (the leftward direction in FIG. 5: the mounting direction side of the upper step side tray 14, and the paper sending-out direction side), at the feedable position of the upper step side tray 14, as the first feeding roller 10 rotates being in contact with the highest paper sheet P2 accommodated in the upper step side tray 14, the highest paper sheet P2 is sent out from the upper step side tray 14.

Meanwhile, in a state where the upper step side tray 14 slides to the apparatus front surface side (+Y side), that is, when the upper step side tray 14 is at the above-described retreating position, the roller supporting member 11 oscillates around the rotation shaft 12, the first feeding roller 10 can be in contact with the highest paper sheet P1 accommodated in the lower step side tray 13, and as the first feeding roller 10 rotates, the highest paper sheet P1 is sent out from the lower step side tray 13.

Furthermore, as described above, even in a case where the paper sheet is not mounted on any one side, the lower step side tray 13 and the upper step side tray 14 can feed the paper sheet from the other side.

On the downstream side of the first feeding roller 10, an intermediate roller 17 which is driven to be rotated by the motor which is not illustrated is provided, and the paper sheet P is curved and reversed by the intermediate roller 17, and is toward the apparatus front side. Furthermore, reference numerals 19 and 20 are driven rollers which can be rotated to be driven, and at least the paper sheet P is nipped by the driven roller 19 and the intermediate roller 17, and additionally, is nipped by the driven roller 20 and the intermediate roller 17, and sent to the downstream side.

The paper sheet sent along the feeding path T2 illustrated by a dot line is merged with the feeding path T1 (two-dot chain line) in front of the transport driving roller 24 and the transport driven roller 25, and further on the downstream side, similar to the paper sheet fed from the manual feed tray 7, the paper sheet is transported by the transport driving roller 24 and the transport driven roller 25, and is discharged toward the paper discharge receiving tray 8 by the discharge driving roller 31 and the discharge driven roller 32 after the recording is performed by the recording head 30.

In addition, in a case where the recording is performed on both surfaces of the paper sheet P, after the recording is performed on a front surface by the recording head 30, by switching back, the paper sheet P enters the transporting path from a lower side of the intermediate roller 17, and by curving and reversing, it is possible to perform the recording on a rear surface of the paper sheet P. Furthermore, a reference numeral 18 is a driven roller which can be rotated to be driven by the rotation of the intermediate roller 17.

Furthermore, the invention is not limited to the above-described embodiment, various modifications are possible within a range of the invention described in the range of the claims are possible, and the modifications are included in the range of the invention.

The entire disclosure of Japanese Patent Application No. 2016-035195, filed Feb. 26, 2016 is expressly incorporated by reference herein.

What is claimed is:

1. An image reading apparatus comprising:
   a reading unit which extends in a main scanning direction, and is movable in an auxiliary scanning direction intersecting with the main scanning direction; and
   a moving mechanism which moves the reading unit,
   wherein the moving mechanism includes a driving pulley which is driven by a power source, a plurality of driven pulleys which are rotatably driven, an endless belt which is engaged and rotates between the driving pulley and the plurality of driven pulleys, and attracts the reading unit, and a biasing unit which applies tension to the endless belt, wherein, in the endless belt, an attraction section of a belt section that extends along the auxiliary scanning direction, and which attracts the reading unit, is formed between a first driven pulley and a second driven pulley, wherein the driving pulley is provided at a position separated from the attraction section in the main scanning direction, wherein a biasing force of the biasing unit is applied to the belt section excluding the attraction section in the endless belt, and wherein the biasing unit and the belt section excluding the attraction section in the endless belt are located between a first one of the plurality of driven pulleys and the driving pulley.

2. The image reading apparatus according to claim 1, wherein the driving pulley is provided at a position of not protruding to the outside from the first driven pulley and the second driven pulley in the auxiliary scanning direction.

3. The image reading apparatus according to claim 1, wherein the biasing unit is provided in the belt section of which the distance is the shortest in the endless belt.

4. The image reading apparatus according to claim 1, wherein a plurality of the driven pulleys are provided to be retreatable in the biasing direction by the biasing unit, and is provided with a third driven pulley which applies tension to the endless belt by receiving the biasing force of the biasing unit.

5. The image reading apparatus according to claim 4, further comprising:

a holder which supports the third driven pulley, is biased by the biasing unit, and is displaceable in the biasing direction, wherein the biasing unit is covered with the holder.

6. The image reading apparatus according to claim 5, wherein the biasing unit is a compression spring.

7. A recording apparatus comprising:

a recording mechanism portion provided with a transport unit that transports a recording medium, and a recording unit that performs recording on the transported recording medium; and the image reading apparatus according to claim 1 which is provided in an upper portion of the recording mechanism portion.

8. The recording apparatus according to claim 7, wherein a biasing mechanism including the biasing unit is disposed to avoid a transport region of the recording medium in a medium width direction intersecting with a transport direction of the recording medium.

9. The recording apparatus according to claim 7, wherein the image reading apparatus includes a first linking portion and a second linking portion which are linked to be rotatable to the recording mechanism portion in an upper portion of the recording mechanism portion, open and close the upper portion of the recording mechanism portion by rotating, and are linked to be rotatable to the recording mechanism portion which is disposed on the outside of a moving region when the moving region of the reading unit is viewed in a plan view, and wherein a power source of the reading unit is disposed at least in one of the first linking portion and the second linking portion.

* * * * *